United States Patent
Sohn et al.

(10) Patent No.: US 11,941,084 B2
(45) Date of Patent: Mar. 26, 2024

(54) SELF-SUPERVISED LEARNING FOR ANOMALY DETECTION AND LOCALIZATION

(71) Applicant: Google LLC, Mountain View, CA (US)

(72) Inventors: Kihyuk Sohn, Mountain View, CA (US); Chun-Liang Li, Mountain View, CA (US); Jinsung Yoon, San Jose, CA (US); Tomas Jon Pfister, Foster City, CA (US)

(73) Assignee: Google LLC, Mountain View, CA (US)

( * ) Notice: Subject to any disclaimer, the term of this patent is extended or adjusted under 35 U.S.C. 154(b) by 330 days.

(21) Appl. No.: 17/454,605

(22) Filed: Nov. 11, 2021

(65) Prior Publication Data
US 2022/0156521 A1   May 19, 2022

Related U.S. Application Data

(60) Provisional application No. 63/113,780, filed on Nov. 13, 2020.

(51) Int. Cl.
| | |
|---|---|
| *G06F 18/214* | (2023.01) |
| *G06N 3/08* | (2023.01) |
| *G06V 10/22* | (2022.01) |
| *G06V 10/774* | (2022.01) |
| *G06V 10/82* | (2022.01) |

(52) U.S. Cl.
CPC .......... *G06F 18/2155* (2023.01); *G06N 3/08* (2013.01); *G06V 10/22* (2022.01)

(58) Field of Classification Search
CPC ...... G06F 18/2155; G06N 3/08; G06V 10/22; G06V 10/774; G06V 10/82; G06T 2207/20132
See application file for complete search history.

(56) References Cited

U.S. PATENT DOCUMENTS

| | | | |
|---|---|---|---|
| 2019/0156502 A1* | 5/2019 | Lee | ............................ G06T 7/11 |
| 2019/0286940 A1* | 9/2019 | Shen | ........................ G06T 11/60 |

(Continued)

OTHER PUBLICATIONS

Mar. 11, 2022 Written Opinion (WO) of the International Searching Authority (ISA) and International Search Report (ISR) issued in International Application No. PCT/US2021/059030.

(Continued)

*Primary Examiner* — John W Lee
(74) *Attorney, Agent, or Firm* — Honigman LLP; Brett A. Krueger

(57) ABSTRACT

A method for training a machine learning model includes obtaining a set of training samples. For each training sample in the set of training samples, during each of one or more training iterations, the method includes cropping the training sample to generate a first cropped image, cropping the training sample to generate a second cropped image that is different than the first cropped image, and duplicating a first portion of the second cropped image. The method also includes overlaying the duplicated first portion of the second cropped image on a second portion of the second cropped image to form an augmented second cropped image. The first portion is different than the second portion. The method also includes training the machine learning model with the first cropped image and the augmented second cropped image.

20 Claims, 7 Drawing Sheets

(56) References Cited

U.S. PATENT DOCUMENTS

2020/0090316 A1* 3/2020 Man ................... G06V 10/7557
2023/0168513 A1* 6/2023 Yeh ..................... H04N 13/344
359/630

OTHER PUBLICATIONS

Ke Lipeng et al., "Multi-Scale Structure-Aware Network for Human Pose Estimation", Oct. 9, 2018 (Oct. 9, 2018), Advances in Biometrics : International Conference, ICB 2007, Seoul, Korea, Aug. 27-29, 2007 ; Proceedings; [Lecture Notes in Computer Science; Lect.Notes Computer], Springer, Berlin, Heidelberg, pp. 731-746.
Chen Beijing et al, "A Serial Image Copy-Move Forgery Localization Scheme With Source/Target Distinguishment", Sep. 28, 2020 (Sep. 28, 2020), vol. 23, p. 3506-3517.
31st Meeting of the IEEE/CVF Conference On Computer Vision and Pattern Recognition (CVPR 2018), CVPR, Salt Lake City,Jun. 5, 2018 (Jun. 5, 2018).

* cited by examiner

SELF-SUPERVISED LEARNING FOR ANOMALY DETECTION AND LOCALIZATION

CROSS REFERENCE TO RELATED APPLICATIONS

This U.S. patent application claims priority under 35 U.S.C. § 119(e) to U.S. Provisional Application 63/113,780, filed on Nov. 13, 2020. The disclosure of this prior application is considered part of the disclosure of this application and is hereby incorporated by reference in its entirety.

TECHNICAL FIELD

This disclosure relates to self-supervised learning for anomaly detection and localization.

BACKGROUND

Anomaly detection using machine learning models aims at detecting an instance containing anomalous and defective patterns that are different from those seen in normal instances. Many problems from different application domains of computer vision exist for anomaly detection, including manufacturing defect detection, medical image analysis, and video surveillance. Unlike a typical supervised classification problem, anomaly detection problems face a few unique challenges. First, due to the nature of the problem, it is difficult to obtain a large amount of anomalous data, either labeled or unlabeled. Second, the differences between normal and anomalous patterns are often fine-grained as defective areas might be small and subtle in high-resolution images.

SUMMARY

One aspect of the disclosure provides a method for training a machine learning model. The method includes obtaining, at data processing hardware, a set of training samples. For each training sample in the set of training samples, during each of one or more training iterations, the method includes cropping, by the data processing hardware, the training sample to generate a first cropped image. The method also includes cropping, by the data processing hardware, the training sample to generate a second cropped image that is different than the first cropped image and duplicating, by the data processing hardware, a first portion of the second cropped image. The method also includes overlaying, by the data processing hardware, the duplicated first portion of the second cropped image on a second portion of the second cropped image to form an augmented second cropped image. The first portion is different than the second portion. The model also includes training, by the data processing hardware, the machine learning model with the first cropped image and the augmented second cropped image.

Implementations of the disclosure may include one or more of the following optional features. In some implementations, the duplicated first portion of the second cropped image has a rectangular shape with a variable length and width. In some implementations, overlaying the duplicated first portion of the second cropped image on the second portion of the second cropped image includes selecting a random location of the second cropped image for the second portion of the second cropped image and overlaying the duplicated first portion of the second cropped image at the selected random location.

In some examples, training the machine learning model with the first cropped image and the augmented second cropped image includes determining a first cross-entropy loss for the first cropped image, determining a second cross-entropy loss for the augmented second cropped image, and determining a total cross-entropy loss based on the first cross-entropy loss and the second cross-entropy loss. The total cross-entropy loss may include a sum of the first cross-entropy loss and the second cross-entropy loss.

Optionally, each training sample may be unlabeled. In some implementations, the machine learning model includes a convolutional neural network. In some implementations, the machine learning model is configured to detect anomalous patterns in image data. The method may further include, prior to overlaying the duplicated first portion of the second cropped image on the second portion of the second cropped image, rotating, by the data processing hardware, the duplicated first portion of the second cropped image. In some implementations, the method further includes, prior to overlaying the duplicated first portion of the second cropped image on the second portion of the second cropped image, applying, by the data processing hardware, a color jitter to the duplicated first portion of the second cropped image.

Another aspect of the disclosure provides a system for training a machine learning model. The system includes data processing hardware and memory hardware in communication with the data processing hardware. The memory hardware stores instructions that when executed on the data processing hardware cause the data processing hardware to perform operations. The operations include obtaining a set of training samples. For each training sample in the set of training samples, during each of one or more training iterations, the operations include cropping the training sample to generate a first cropped image and cropping the training sample to generate a second cropped image that is different than the first cropped image. The operations also include duplicating a first portion of the second cropped image and overlaying the duplicated first portion of the second cropped image on a second portion of the second cropped image to form an augmented second cropped image. The first portion is different than the second portion. The operations also include training the machine learning model with the first cropped image and the augmented second cropped image.

Implementations of the disclosure may include one or more of the following optional features. In some implementations, the duplicated first portion of the second cropped image has a rectangular shape with a variable length and width. In some examples, overlaying the duplicated first portion of the second cropped image on the second portion of the second cropped image includes selecting a random location of the second cropped image for the second portion of the second cropped image and overlaying the duplicated first portion of the second cropped image at the selected random location.

Optionally, training the machine learning model with the first cropped image and the augmented second cropped image may include determining a first cross-entropy loss for the first cropped image, determining a second cross-entropy loss for the augmented second cropped image, and determining a total cross-entropy loss based on the first cross-entropy loss and the second cross-entropy loss. The total cross-entropy loss may include a sum of the first cross-entropy loss and the second cross-entropy loss.

In some implementations, each training sample is unlabeled. In some implementations, the machine learning model includes a convolutional neural network. In some implementations, the machine learning model is configured to detect anomalous patterns in image data. The operations may further include, prior to overlaying the duplicated first portion of the second cropped image on the second portion of the second cropped image, rotating, by the data processing hardware, the duplicated first portion of the second cropped image. In some implementations, the operations further include, prior to overlaying the duplicated first portion of the second cropped image on the second portion of the second cropped image, applying, by the data processing hardware, a color jitter to the duplicated first portion of the second cropped image.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Anomaly detection using machine learning models aims at detecting an instance containing anomalous and defective patterns that are different from those seen in normal instances. Many problems from different application domains of computer vision exist for anomaly detection, including manufacturing defect detection, medical image analysis, and video surveillance. Unlike a typical supervised classification problem, anomaly detection problems face a few unique challenges. First, due to the nature of the problem, it is difficult to obtain a large amount of anomalous data, either labeled or unlabeled. Second, the differences between normal and anomalous patterns are often fine-grained as defective areas might be small and subtle in high-resolution images.

Due to limited access to anomalous data, constructing an anomaly detector is often conducted under semi-supervised or one-class classification settings using normal data only (i.e., non-anomalous data). Because the distribution of anomaly patterns is generally unknown in advance, models are often trained to learn patters of normal instances and detect an anomaly when a test sample is not well represented by these models. For example, an autoencoder that is trained to reconstruct normal data is used to declare anomalies when the data reconstruction error is high. Generative models declare a sample anomalous when a probability density is below a certain threshold. However, an anomaly score defined as an aggregation of pixel-wise reconstruction error or a negative probability density fails to capture high-level semantic information.

Implementations herein are directed toward a model trainer that provides robust training of a machine learning model configured for anomaly detection and localization. The model trainer uses a semi-supervised learning technique that does not require large quantities of anomalous data while still delivering accurate detection of fine-grained anomalous areas.

Figure 1:
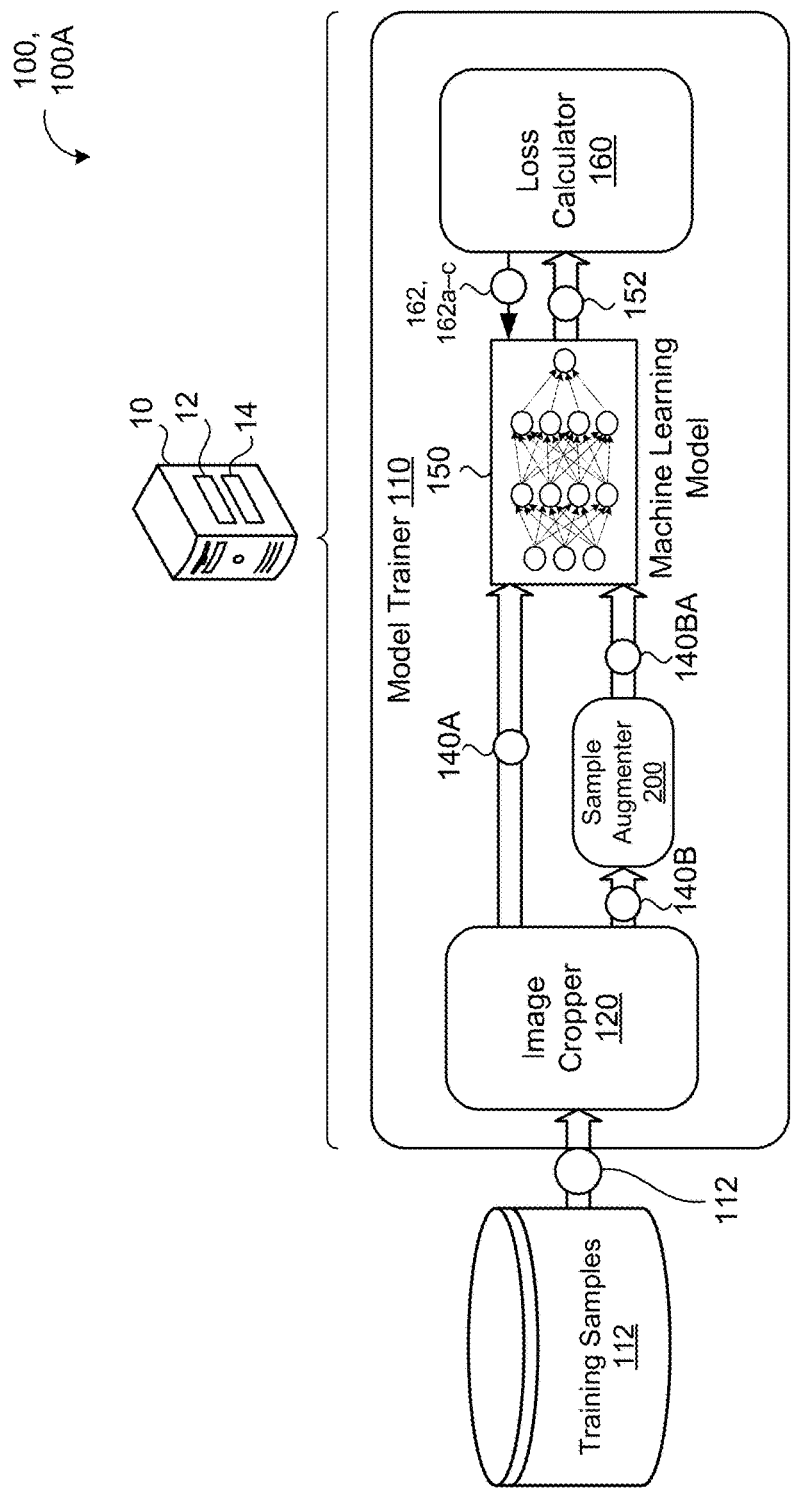
FIG. 1 is a schematic view of a system for training a model for anomaly detection and localization.

Referring to FIG. 1, in some implementations, an example system 100, 100A includes a processing system 10. The processing system 10 may be a single computer, multiple computers, or a distributed system (e.g., a cloud environment) having fixed or scalable/elastic computing resources 12 (e.g., data processing hardware) and/or storage resources 14 (e.g., memory hardware). The processing system 10 executes a model trainer 110. The model trainer 110 trains a machine learning model 150 (e.g., a deep neural network (DNN)) to make predictions based on input data. For example, the model trainer 110 trains a convolutional neural network (CNN) of the machine learning model 150. The model trainer 110 trains the machine learning model 150 on a set of training samples 112. In some implementations, the set of the training samples 112 is stored at the storage resource 14. Each of the training samples 112 may include an image or images of normal patterns (i.e., patterns that do not include anomalies). For example, the images of normal patterns have a resolution of 256×256 pixels. As will be described in more detail below, the model trainer 110 is configured to generate one or more augmented images with anomalies based on the image of normal patterns in accordance with some implementations. The one or more anomalous images generated by the model trainer 110 may be provided as augmentation input data to enhance or improve the training of the machine learning model 150.

The model trainer 110 obtains the training samples 112, in some implementations, from the storage resources 14 or other device suitable to store the training samples 112. The training samples 112 may be unlabeled. In other words, one or more training samples (images) or each training sample in the set of the training samples 112 may not include a label indicting an anomaly, or lack thereof, in the corresponding training sample 112.

In some implementations, the model trainer 110 includes an image cropper 120. The image cropper 120 crops each image of the training samples 112 into a smaller size image (i.e., by removing a portion of the pixels of the original image). In some implementations, the image cropper 120 is configured to crop a 256×256 image (i.e., an image with 256 rows and 256 columns of pixels) into 64×64 image or 32×32 image. The image cropper 120 may crop a training sample 112 into one or more cropped images. For example, the image cropper may crop a respective training sample 112 into a first cropped image 140A and a second cropped image 140B. The first cropped image 140A may be different than the second cropped image 140B. For example, the image cropper 120 crops two different portions for the first cropped image 140A and the second cropped image 140B respectively. As discussed in more detail below, the portions of the image that the image cropper 120 selects to crop may be pseudo-random or random. The first and second cropped image 140A, 140B may be the same size or different sizes.

The model trainer 110, in some implementations, includes a sample augmenter 200. The sample augmenter 200 receives the second cropped image 140B for each of the training samples 112 and generates an augmented second cropped image 140BA. In some implementations, to generate the augmented second cropped image 140BA, the sample augmenter 200 duplicates (i.e., copies) a first portion 210 of the second cropped image 140B and overlays the duplicated first portion 210 of the second cropped image 140B on a second portion 220 of the second cropped image 140B to form the augmented second cropped image 140BA (FIG. 2).

Figure 2:
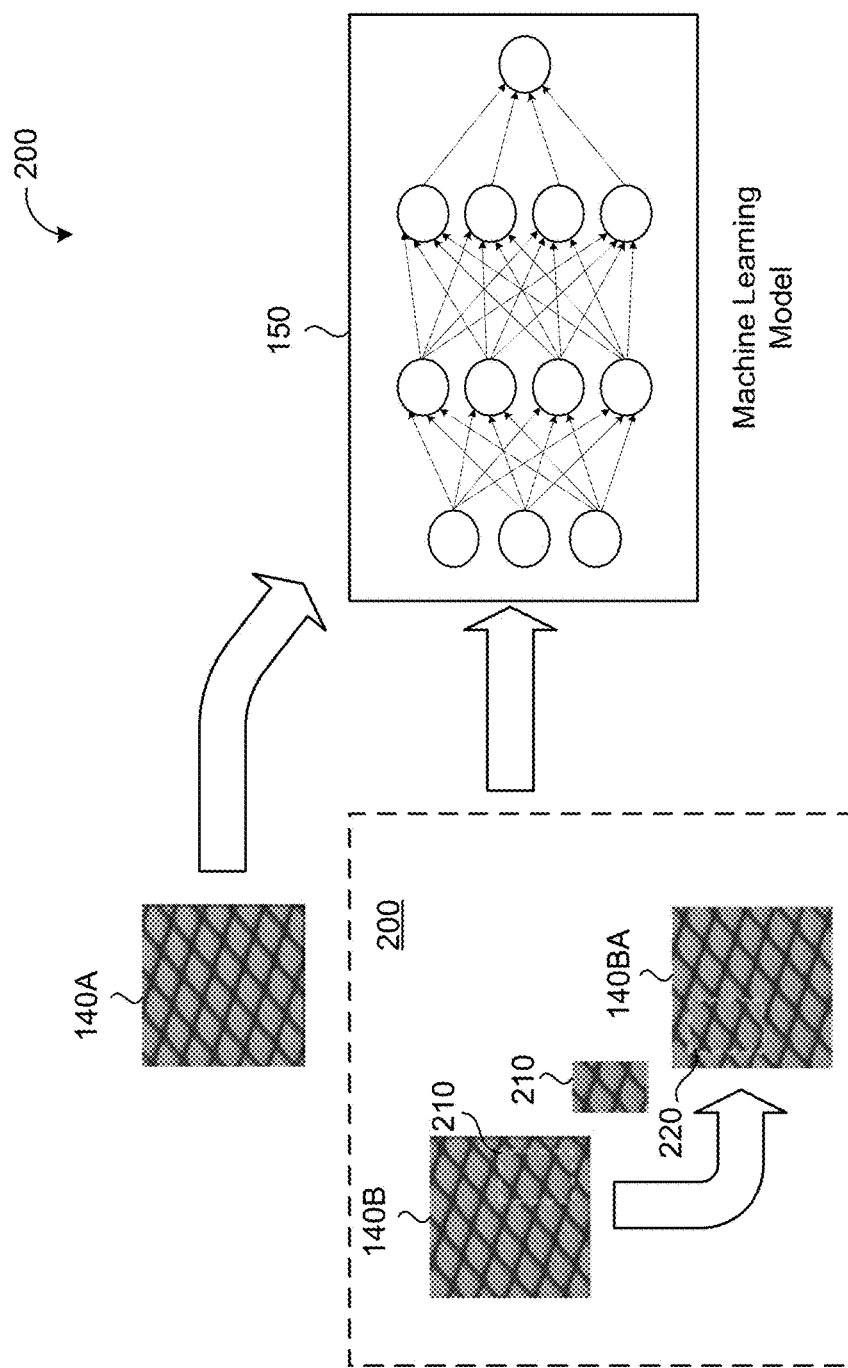
FIG. 2 is a schematic view illustrating a learning method for anomaly detection and localization.

Referring now to FIG. 2, the sample augmenter 200 may "cut" or copy or duplicate a first portion 210 of the second cropped image 140B and "paste" the copied first portion 210 over a different second portion 220 of the same second cropped image 140B, thus generating an augmented second cropped image 140BA of the original second cropped image 140B. In some implementations, the copied or duplicated first portion 210 of the second cropped image 140B has a particular or pre-selected shape. The size and the shape of the duplicated first portion 210 of the second cropped image 140B may be varied. For example, the duplicated first portion 210 of the second cropped image 140B has a rectangular shape. The length and width of the rectangular shape may vary based on user configuration and/or parameters of the samples 112 or model 150. In some implementations, the rectangular shape is similar to a "scar" portion as described in more detail below.

In some examples, to generate the augmented second cropped image 140BA, the sample augmenter 200 selects the first portion 210 at a first random location of the second cropped image 140B, duplicates the first portion 210 of the second cropped image 140B, and overlays or places the duplicated first portion 210 of the second cropped image 140B on a second portion 220 at a second random location on the second cropped image 140B. To augment the second cropped image 140B, the two random locations may be different locations on the second cropped image 140B. As a result, the augmented second cropped image 140BA is provided to enhance or improve the training of the machine learning model 150 as compared to being trained on unaugmented training samples 112 alone.

Referring back to FIG. 1, the model trainer 110, in some examples, trains a machine learning model 150 using both the first cropped image 140A and the augmented second cropped image 140BA. In some implementations, the machine learning model 150 is trained using a cross-entropy loss. For example, the training objective of the machine learning model 150 may be expressed as:

$$E_{x \in X}\{CE(g(c(x)),0)+CE(g(CP(c(x))),1)\} \quad (1)$$

In Equation (1), the c(x) function provides the cropped image (e.g., the first cropped image 140A or the second cropped image 140B) at a random location x. Moreover, X denotes a normal data distribution, CP (·) denotes a "cut" and "paste" augmentation as described above, g denotes an output of classifier (e.g., a binary classifier or finer-grained classifier) parameterized by a network, and CE (·,·) denotes the cross-entropy loss. The model trainer 110 may include a loss calculator 160. As shown in Equation (1), in some implementations, the loss calculator 160 determines a first cross-entropy loss 162, 162a based on a prediction 152 made by the machine learning model 150 when provided the first cropped image 140A as input. Additionally or alternatively, the model trainer 110 determines a second cross-entropy loss 162, 162b based on a second prediction 152 made by the machine learning model 150 when provided the augmented second cropped image 140BA as input. The loss calculator 160 may determine an overall cross-entropy loss 162, 162c (e.g., total cross-entropy loss) based on the first cross-entropy loss 162a and the second cross-entropy loss 162b (e.g., by summing the first cross entropy loss 162a and the second cross entropy loss 162b as shown in the equation (1)). The loss 162 is provided back to the model 150 to adjust parameters (e.g., weights) of the model 150 train or fine-tune the model 150.

Referring again to FIG. 2, in some implementations, the sample augmenter 200 generates the augmented second cropped image 140BA based on the second cropped image 140B. In the illustrative example shown in the FIG. 2, each of the first cropped image 140A and the second cropped image 140B includes a mesh pattern. The augmenter 200 "cuts" or copies the first portion 210 of the second cropped image 140B (i.e., a rectangular portion at the lower right corner of the second cropped image 140B) and overlays or places the duplicated first portion 210 on the second portion 220 of the second cropped image 140B (i.e., a rectangular portion on the upper left corner of the second cropped image 140B) to form or generate the augmented second cropped image 140BA including a misaligned mesh pattern caused by the "pasted" first portion 210 of the second portion 220 of the second cropped image 140B.

The location (or position or orientation) of the first portion 210 of the second cropped image 140B and the second portion 220 of the second cropped image 140B are not limited to the specific locations (or positions or orientations) discussed herein. For example, the sample augmenter 200 copies or duplicates the first portion 210 at a random location on the second cropped image 140B (e.g., the center portion) and overlays or places the duplicated first portion 210 over the second portion 220 at a random location on the second cropped image 140B (e.g., the upper right corner side) to generate the augmented second cropped image 140BA. In some implementations, the first portion 210 and the second portion 220 are selected at different random locations within the second cropped image 140B to generate the augmented second cropped image 140BA that can be used to train the machine learning model 150. In some implementations, the length and width of the rectangular shape (i.e., first portion and the second portion) may be varied. While in the example of FIG. 2 a size of the first portion 210 and the second portion 220 are the same, in some implementations, the size of the first portion 210 and the second portion 220 are different. As shown in the FIG. 2, the duplicated first portion 210 included in the augmented second cropped image 140BA provides the anomalies (i.e., misaligned mesh pattern) to the mesh pattern of the second cropped image 140BA.

Additionally or alternatively, the model trainer 110 may further enhance the augmented second cropped image 140BA to further provide valuable training for the machine learning model 150. In some implementations, the sample augmenter 200 of the model trainer 110 rotates the duplicated first portion 210 of the second cropped image 140B by a pre-selected degree of rotation (i.e., in a clockwise or counter-clockwise direction) or a random degree of rotation (i.e., in the clockwise or counter-clockwise direction) prior to overlaying the duplicated first portion 210 on the second portion 220 of the second cropped image 140B. Additionally or alternatively, the augmenter 200 of the model trainer 110 applies a color jitter to the duplicated first portion 210 of the second cropped image 140B prior to overlaying the duplicated first portion 210 on the second portion 220 of the second cropped image 140B. For example, the augmenter 200 of the model trainer 110 randomly changes at least one of the brightness, contrast, or saturation of the duplicated first portion 210 of the second cropped image 140B to apply the color jitter. Applying the color jitter and the rotation are helpful for some images that include a pattern resistant to augmentation from just the duplication and overlaying technique and require further augmentation to provide valuable training.

In some implementations, the sample augmenter 200 of the model trainer 110 may rotate the duplicated portion of the second cropped image 140B by a pre-selected degree of rotation (in the clockwise or counter-clockwise direction) or a random degree of rotation (in the clockwise or counter-clockwise direction) and then apply the color jitter to the duplicated first portion of the second cropped image 140B prior to overlaying the duplicated first portion on the second portion of the second cropped image 140B. In some implementations, the sample augmenter 200 of the model trainer 110 may apply the color jitter to the duplicated first portion of the second cropped image 140B and then rotate the duplicated portion of the second cropped image 140B by a pre-selected degree of rotation (in the clockwise or counter-clockwise direction) or a random degree of rotation (in the clockwise or counter-clockwise direction) prior to overlaying the duplicated first portion on the second portion of the second cropped image 140B.

The duplication and overlaying technique (along with the color jitter and/or the rotation features) introduces a spatial irregularity. For example, by overlaying "rectangular patches" (e.g., the first portion 210 of the second cropper image 140B) of different size, aspect ratio, and rotation angles on the second portion 220 of the second cropper image 140B, the augmentation data is more diversified for enhanced training of the machine learning model 150.

Figure 3:
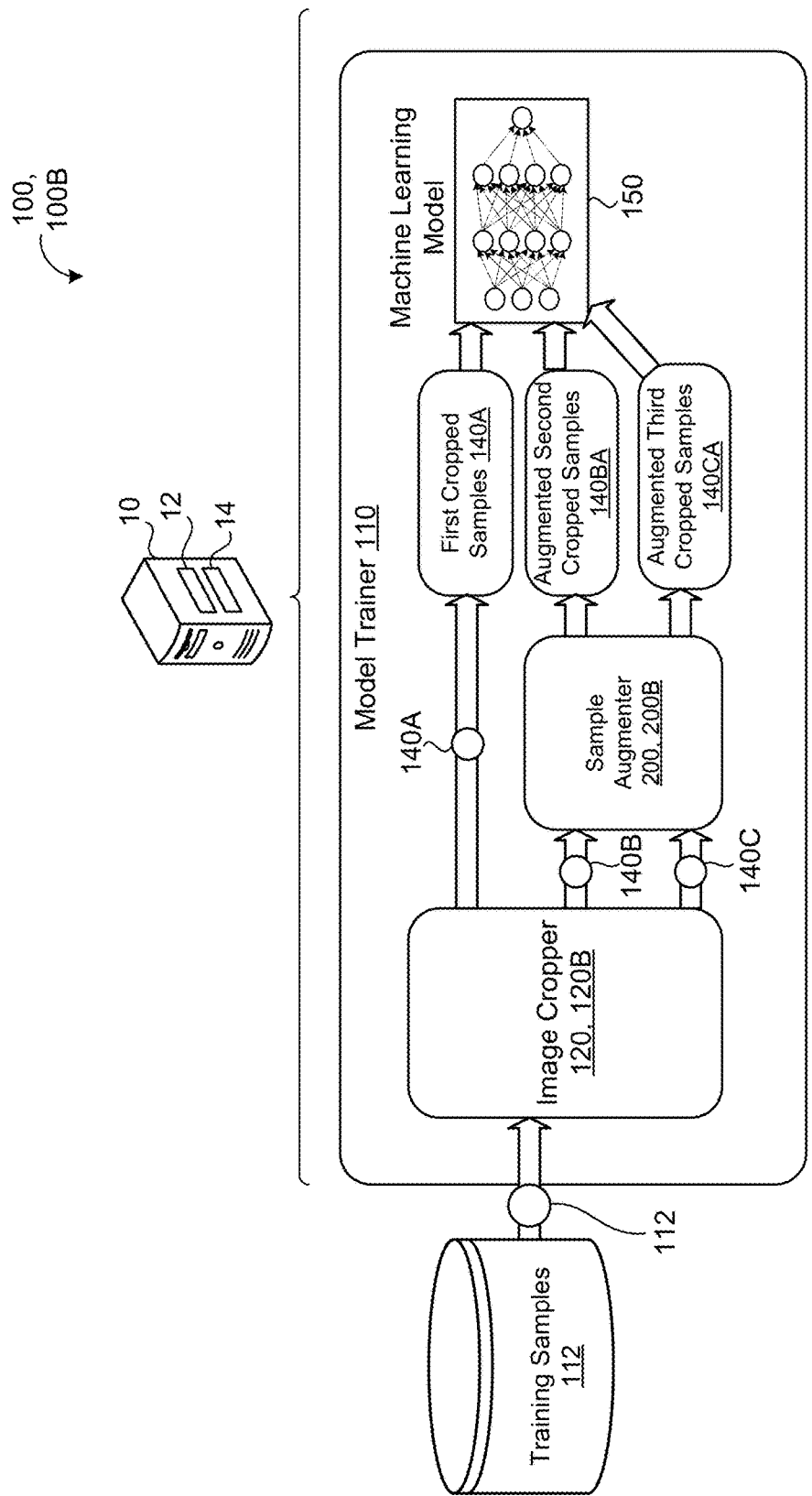
FIG. 3 is a schematic view of another system for training a model for anomaly detection and localization.

Referring to FIG. 3, in some implementations, an example system 100, 100B includes an image cropper 120, 120B for cropping an image of one or more training samples 112 into a plurality of cropped images including the first cropped image 140A, the second cropped image 140B, and a third cropped image 140C. Each of the first cropped image 140A, the second cropped image 140B, and the third cropped image 140C may be different from each other. That is the image cropper 120 crops three different portions of the original image for the first cropped image 140A, the second cropped image 140B, and the third cropped image 140C. The portions of the image in the training samples 112 that the image cropper 120 selects to crop may be pseudo-random or random. The first, second, and third cropped image 140A, 140B, 140C may be the same size or different sizes.

The model trainer 110 may include a sample augmenter 200, 200B. The sample augmenter 200B is configured to generate the augmented second cropped image 140BA and an augmented third cropped image 140CA based on the third cropped image 140C. As discussed above, the image cropper 120, for each image in the training samples 112, crops the image of the training samples 112 into the plurality of cropped images which includes, in some examples, the first cropped image 140A, the second cropped image 140B, and the third cropped image 140C. The sample augmenter 200B may generate other quantities of cropped images 140 as well.

Figure 4:
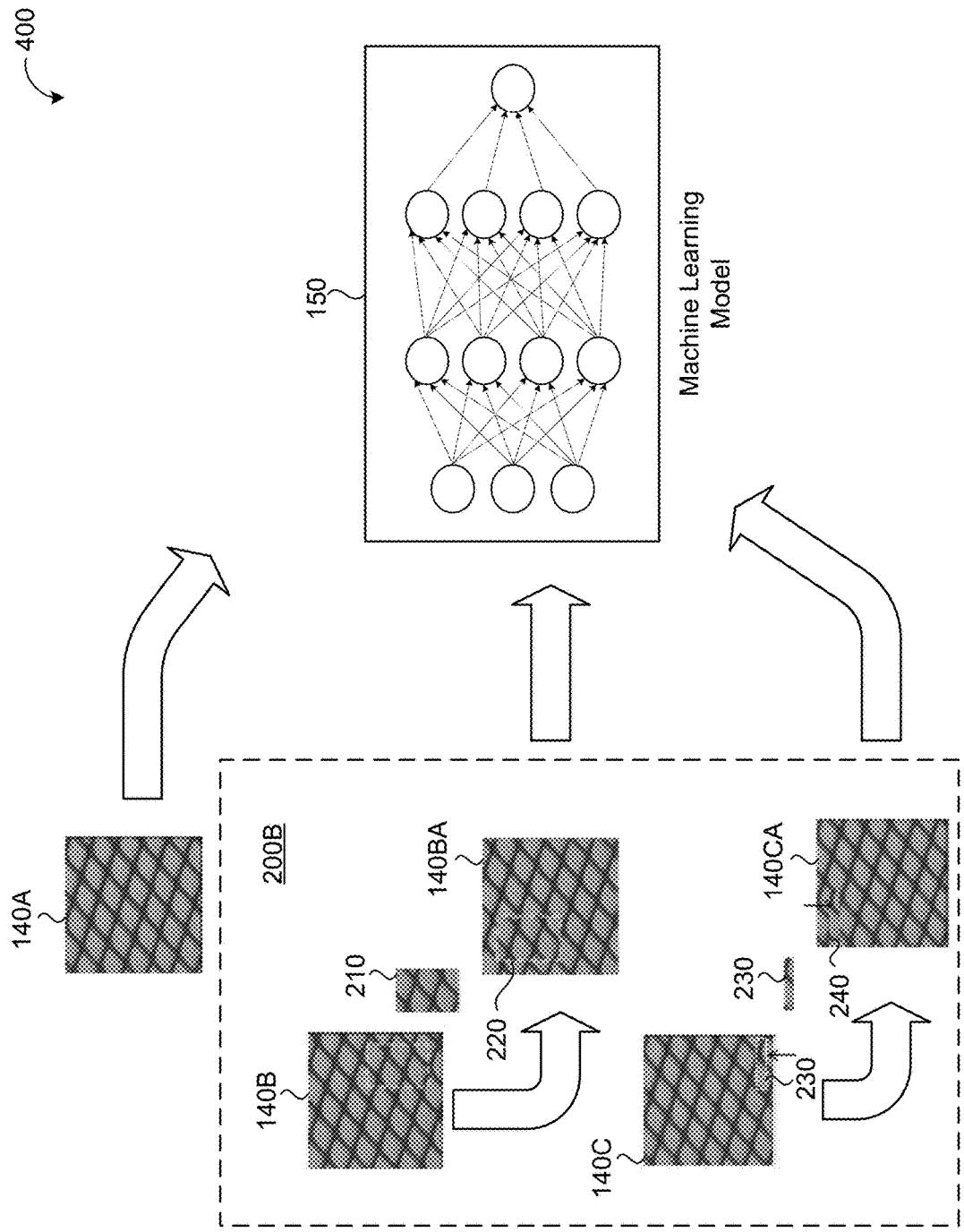
FIG. 4 is a schematic view illustrating a learning method for anomaly detection and localization using a scar technique.

Referring now to FIG. 4, in some implementations, the sample augmenter 200 receives the third cropped image 140C for each of the training samples 112 and generates an augmented third cropped image 140CA. Optionally, to generate the augmented third cropped image 140CA, the sample augmenter 200, similar to portions 210, 220, duplicates (i.e., copies) a first portion 230 of the third cropped image 140C and overlays the duplicated first portion 230 of the third cropped image 140C on a second portion 240 of the third cropped image 140C to form the augmented third cropped image 140CA. That is, the sample augmenter 200 may "cut" or copy a portion 230 of the third cropped image 140C and "paste" the copied portion 230 over a different portion 240 of the same third cropped image 140C, thus augmenting the original third cropped image 140C. In particular, the copied or duplicated portion 230 of the third cropped image 140C has a long thin rectangular shape, which may be referred to as a "scar" portion 230. In some implementations, the "scar" portion 230 is smaller than the first portion 210 (i.e., the "rectangular patch") included in the augmented second cropped image 140BA.

In some examples, to generate the augmented third cropped image 140CA, the sample augmenter 200 selects and duplicates the first portion 230 at a random location on the third cropped image 140C (i.e., the first portion 230 in the long thin rectangular shape) and overlays or places the duplicated portion 230 of the third cropped image 140C on the second portion 240 at a random location on the third cropped image 140C. In some implementations, the first portion 230 and the second portion 240 are located at different locations. As a result, the augmented third cropped image 140CA with the "scar" portion 230 is provided to enhance or improve the training of the machine learning model 150.

Additionally or alternatively, the sample augmenter 200 of the model trainer 110 may further enhance the augmented third cropped image 140CA in the same or similar manner as the second cropped image 140BA to provide further valuable training to the machine learning model 150. In some implementations, the sample augmenter 200 of the model trainer 110 rotates the duplicated first portion 230 of the third cropped image 140C (e.g., "scar" portion) by a pre-selected degree of rotation (in the clockwise or counter-clockwise direction) or a random degree of rotation (in the clockwise or counter-clockwise direction) prior to overlaying the duplicated first portion 230 on the second portion 240 of the third cropped image 140C. In some implementations, the model trainer 110 may apply the color jitter to the duplicated first portion 230 of the third cropped image 140C (e.g., "scar" portion) prior to overlaying the duplicated first portion 230 on the second portion 240 of the third cropped image 140C.

For example, the sample augmenter 200 of the model trainer 110 randomly changes at least one of the brightness, contrast, or saturation of the duplicated first portion 230 of the third cropped image 140C to apply the color jitter. In some implementations, the augmenter 200 of the model trainer 110 may rotate the duplicated first portion 230 of the third cropped image 140C (e.g., "scar" portion) by a pre-selected degree of rotation (in the clockwise or counter-clockwise direction) or a random degree of rotation (in the clockwise or counter-clockwise direction) and apply the color jitter to the duplicated first portion 230 of the third cropped image 140C prior to overlaying the duplicated first portion 230 on the second portion 240 of the third cropped image 140C. Applying the color jitter and the rotation are helpful for some images that include a pattern resistant to augmentation from just the duplication and overlaying technique and require further augmentation to provide valuable training. The duplication and overlaying technique (along with the color jitter and/or rotation features) introduces a spatial irregularity. For example, by overlaying the long thin rectangular "scar" (i.e., the first portion of the third cropped image 140C) of different size, aspect ratio, and rotation angles on the random second portion of the third cropped image 140C, diverse augmentation data is generated by the sample augmenter 200.

With continued reference to FIG. 4, in some implementations, the sample augmenter 200 generates the augmented second cropped image 140BA and the augmented third cropped image 140CA based on the second cropped image 140B and third cropped image 140C, respectively. As discussed above, the first cropped image 140A and the augmented second cropped image 140BA are generated to provide additional training images to the machine learning model 150 (FIGS. 2 and 4). As illustrated in schematic view 400, in addition to the first cropped image 140A and the augmented second cropped image 140BA, the augmented third cropped image 140CA provides yet additional training images to the machine learning model 150.

Here, each of the first cropped image 140A, the second cropped image 140B, and the third cropped image 140C includes a mesh pattern. As shown in the FIG. 4, the augmenter 200 "cuts" or copies the first portion 230 of the third cropped image 140C (e.g., a long thin rectangular portion having an approximate 1:6 width-to-length ratio at the lower right corner of the third cropped image 140C) and overlays or places the duplicated first portion 230 on the second portion 240 of the third cropped image 140C (i.e., a long thin rectangular portion having an approximate 1:6 width-to-length ratio on the upper left corner of the third cropped image 140C) to form or generate the augmented third cropped image 140CA including a misaligned mesh pattern caused by the "pasted" first portion 230 of the third cropped image 140C. The location (or position) of the first portion 230 of the third cropped image 140C and the second portion 240 of the third cropped image 140C are not limited to the specific locations (or positions) called out above.

For example, the sample augmenter 200 copies or duplicates a first portion 230 at a random location on the third cropped image 140C (e.g., the center portion) and overlays or places the duplicated first portion 230 on a second portion 240 at a random location on the third cropped image 140C (e.g., the upper right corner side) to generate the augmented third cropped image 140CA. In some implementations, the random locations are different locations within the third cropped image 140C to generate the augmented third cropped image 140CA that can be used to train the machine learning model 150. In some implementations, the width-to-length ratio of the long thin rectangular shape (e.g., approximate 1:6 or a greater) may be varied. In this example, the duplicated first portion 203 included in the augmented third cropped image 140CA provides the "scar" like anomalies (i.e., a "scar" mesh pattern) to the mesh pattern of the third cropped image 140CA. In some implementations, the "scar" portion is smaller than the first portion 210 included in the augmented second cropped image 140BA.

Figure 5:
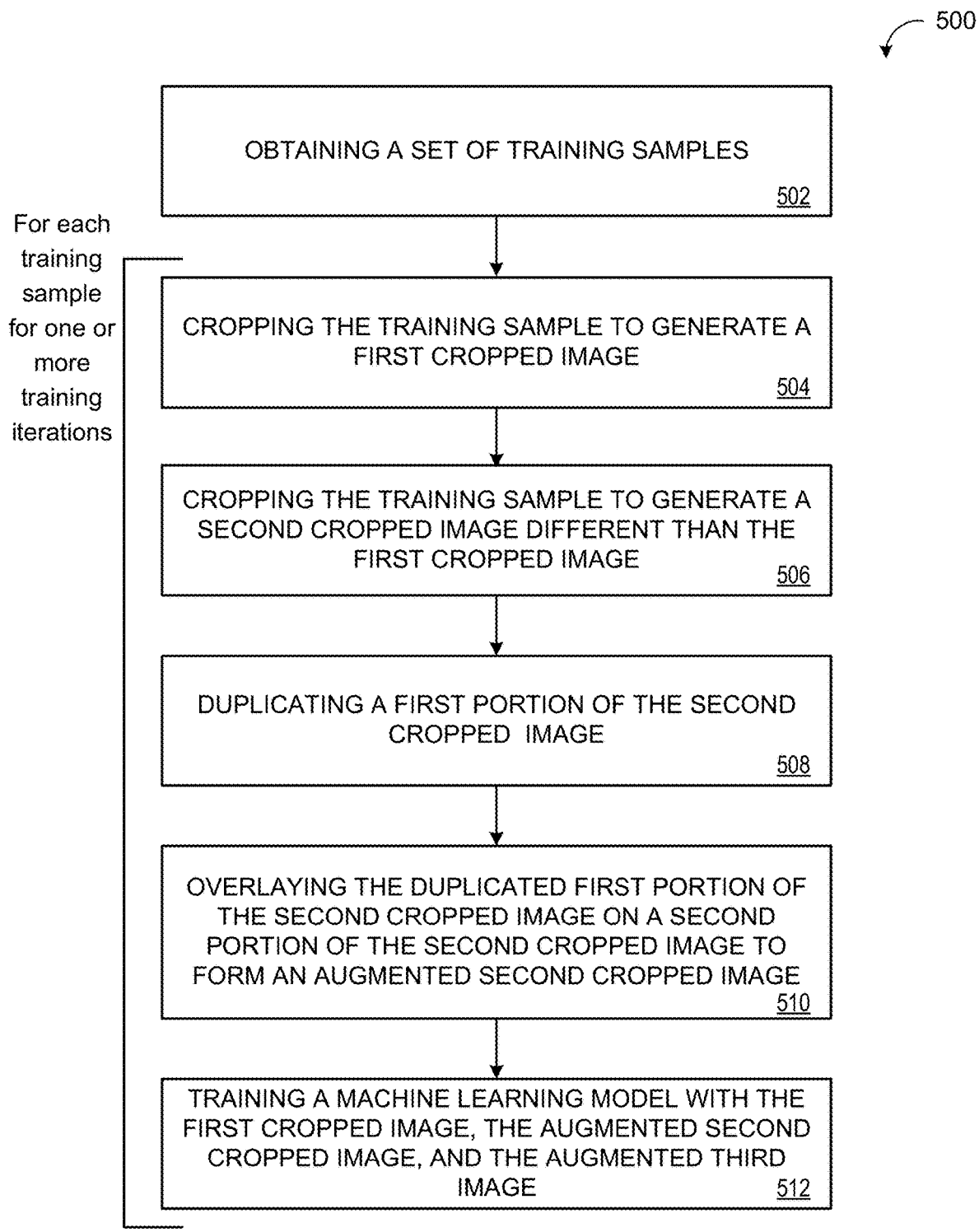
FIG. 5 is a flowchart of an example arrangement of operations for a method of training a model for anomaly detection and localization.

FIG. 5 is a flowchart of an example arrangement of operations for a method 500 for training a model 150 for anomaly detection and localization. The method 500, at operation 502, includes obtaining, at data processing hardware 12, a set of training samples 112. As discussed above, the machine learning model 150 (e.g., convolutional neural network (CNN)) is trained on the set of training samples 112. Each of the training samples 112 may include an image of normal patterns (i.e., patterns that do not include anomalies). For example, the image of normal patterns is 256×256 image.

At operation 504, the method 500 includes, during each of one or more training iterations, cropping, by the data processing hardware 12, the training sample (image) in the training samples 112 to generate a first cropped image 140A. The method 500, at operation 506, includes cropping, by the data processing hardware 12, the training sample (image) in the training samples 112 to generate a second cropped image 140B that is different than the first cropped image 140A. As discussed above, each image from the training samples 112 is cropped into a smaller size image. In some implementations, each 256×256 image in the training samples 112 is cropped into 64×64 image or 32×32 image. The first cropped image 140A may be different than the second cropped image 140B. That is, the image cropper 120 crops two different portions for the first cropped image 140A and the second cropped image 140B. The portions of the training sample (image) in the training samples 112 that are selected to crop may be pseudo-random or random. The first and second cropped image 140A, 140B may be the same size or different sizes.

At operation 508, the method 500 includes duplicating, by the data processing hardware 12, a first portion 210 of the second cropped image 140B and, at operation 510, overlaying, by the data processing hardware 12, the duplicated first portion 210 of the second cropped image 140B on a second portion 220 of the second cropped image 140B to form an augmented second cropped image 140BA. The first portion 210 is different than the second portion 220. As discussed above, in some implementations, the copied or duplicated first portion of the second cropped image 140B has a particular or pre-selected shape. The size and the shape of the duplicated first portion of the second cropped image 140B can be varied. For example, the duplicated first portion of the second cropped image 140B has a rectangular shape. The length and width of the rectangular shape may be varied in accordance with some implementations. In some implementations, to generate the augmented second cropped image 140BA, the location of the first portion 210 of the second cropped image 140B and the location of the second portion 220 of the second cropped image 140B are determined randomly. In some implementations, the method 500 further includes at least one of rotating, by the data processing hardware 12, the duplicated first portion 210 of the second cropped image 140B or applying, by the data processing hardware 12, the color jitter to the duplicated first portion 210 of the second cropped image 140B.

At operation 512, the method 500 includes training, by the data processing hardware 12, the machine learning model 150 with the first cropped image 140A and the augmented second cropped image 140BA.

Figure 6:
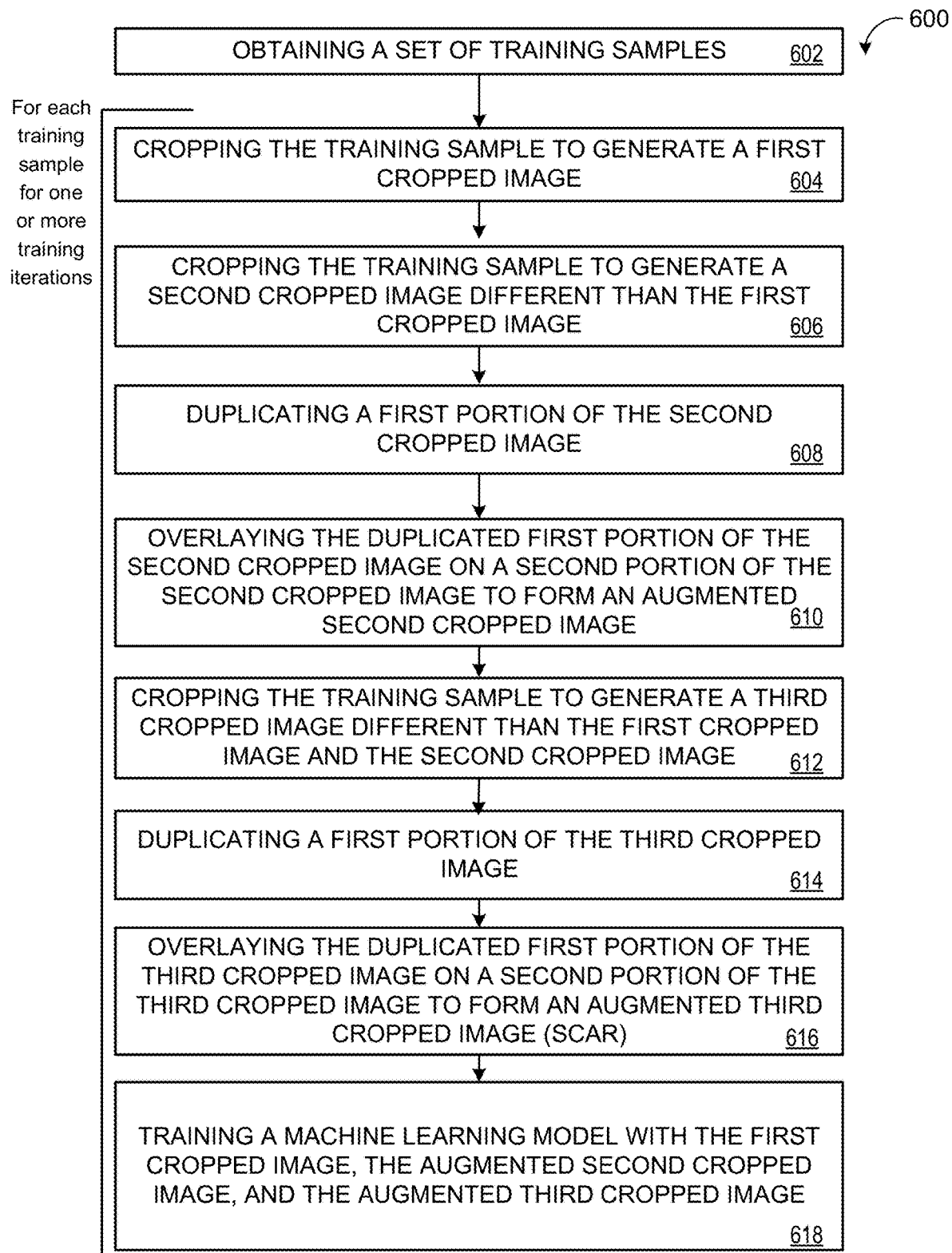
FIG. 6 is a flowchart of an example arrangement of operations for a method of training a model for anomaly detection and localization using a scar technique.

FIG. 6 is a flowchart of an example arrangement of operations for a method 600 for training a model 150 for anomaly detection and localization. The method 600 includes several operations including operations 602-610 that align with operations 502-510 (FIG. 5) have been described above in detail with reference to FIG. 5, and thus, their detailed descriptions are not repeated here. Starting with operation 612, the method 600 includes cropping, by the data processing hardware 12, the training sample (image) in the training samples 112 to generate a third cropped image 140C that is different than the first cropped image 140A and the second cropped image 140B. As discussed above, each image from the training samples 112 is cropped into a smaller size image. In some implementations, each 256×256 image in the training samples 112 is cropped into 64×64 image or 32×32 image, although the any resolution image may be cropped into any smaller resolution image portion. The first cropped image 140A, the second cropped image 140B, and the third cropped image 140C may be different from each other. That is, the image cropper 120 crops three different portions for the first cropped image 140A, the second cropped image 140B, and the third cropped image 140C. The portions of the training sample (image) in the training samples 112 that are selected to crop may be pseudo-random or random. The first, second, third cropped image 140A, 140B, 140C may be the same size or different sizes.

At operation 614, the method 600 includes duplicating, by the data processing hardware 12, a first portion 230 of the third cropped image 140C and, at operation 616, overlaying, by the data processing hardware 12, the duplicated first portion 230 of the third cropped image 140C on a second portion 240 of the third cropped image 140C to form an augmented third cropped image 140CA. The first portion 230 is different than the second portion 240. As discussed above, in some implementations, the copied or duplicated first portion 230 of the third cropped image 140C has a long thin rectangular shape. In some implementations, the first portion 230 and the second portion 240 are selected at different random locations within the third cropped image 140C to generate the augmented third cropped image 140CA that can be used to further train the machine learning model 150. In some implementations, the width-to-length ratio of the long thin rectangular shape (e.g., approximate 1:6 or a greater) may be varied. For example, as shown in the FIG. 4, the duplicated first portion 230 included in the augmented third cropped image 140CA provides the "scar" like anomalies (i.e., "scar" mesh pattern) to the mesh pattern of the third cropped image 140CA. In some implementations, the "scar" portion is smaller than the first portion included in the augmented second cropped image 140BA. In some implementations, the method 600 further includes at least one of rotating, by the data processing hardware 12, the duplicated portion of the third cropped image 140C or applying, by the data processing hardware 12, the color jitter to the duplicated portion of the third cropped image 140C.

At operation 618, the method 600 includes training, by the data processing hardware 12, the machine learning model 150 with the first cropped image 140A, the augmented second cropped image 140BA, and the augmented third cropped image 140CA.

Figure 7:
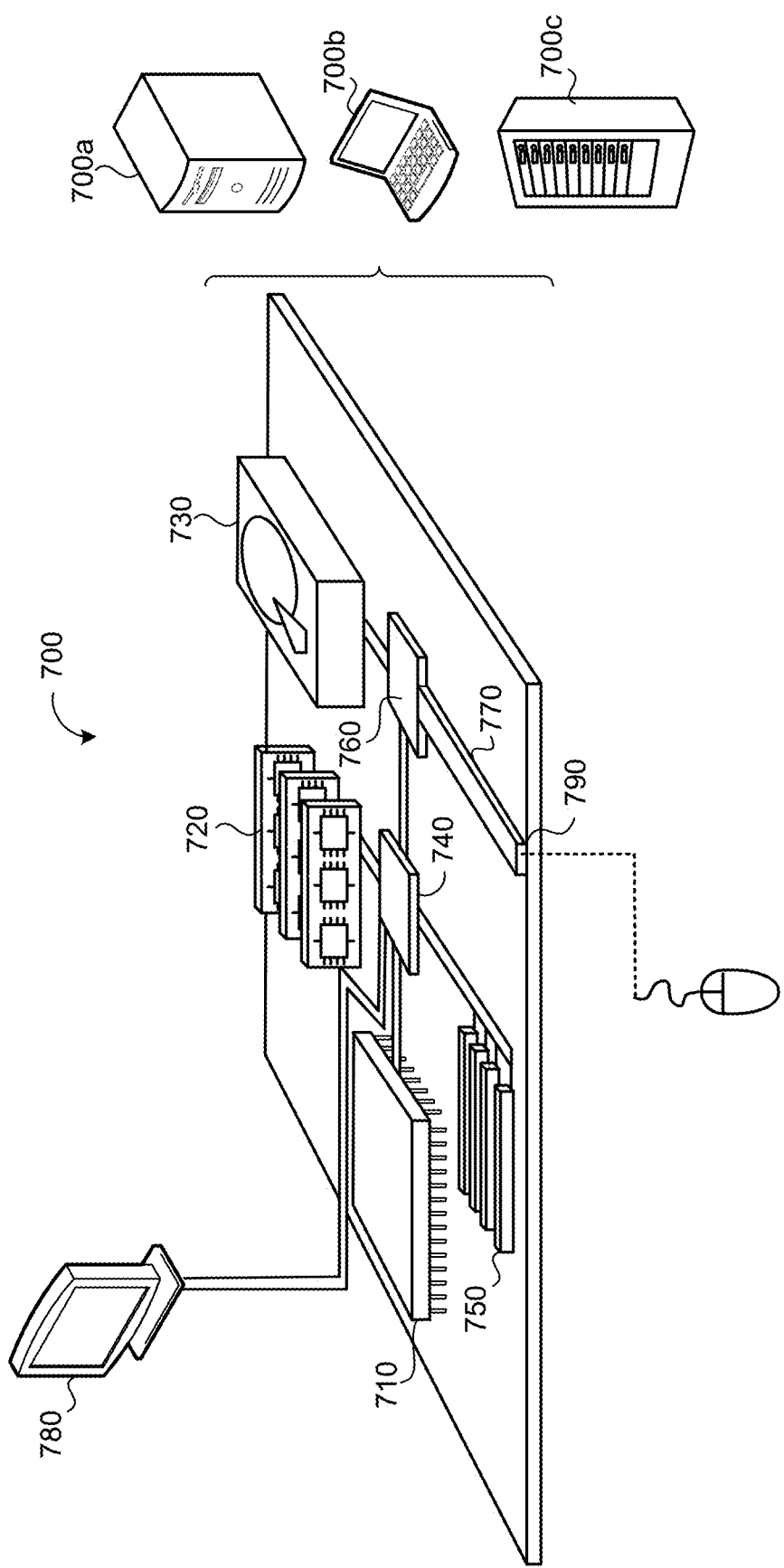
FIG. 7 is a schematic view of an example computing device that may be used to implement the systems and methods described herein.

FIG. 7 is schematic view of an example computing device 700 that may be used to implement the systems and methods described in this document. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 700 includes a processor 710, memory 720, a storage device 730, a high-speed interface/controller 740 connecting to the memory 720 and high-speed expansion ports 750, and a low speed interface/controller 760 connecting to a low speed bus 770 and a storage device 730. Each of the components 710, 720, 730, 740, 750, and 760, are interconnected using various busses, and may be mounted on a common motherboard or in other manners as appropriate. The processor 710 can process instructions for execution within the computing device 700, including instructions stored in the memory 720 or on the storage device 730 to display graphical information for a graphical user interface (GUI) on an external input/output device, such as display 780 coupled to high speed interface 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 720 stores information non-transitorily within the computing device 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and a low-speed expansion port 790. The low-speed expansion port 790, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 700a or multiple times in a group of such servers 700a, as a laptop computer 700b, or as part of a rack server system 700c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method for training a machine learning model, the method comprising:
   obtaining, at data processing hardware, a set of training samples; and
   during each of one or more training iterations, for each training sample in the set of training samples:
      cropping, by the data processing hardware, the training sample to generate a first cropped image;
      cropping, by the data processing hardware, the training sample to generate a second cropped image that is different than the first cropped image;
      duplicating, by the data processing hardware, a first portion of the second cropped image;
      overlaying, by the data processing hardware, the duplicated first portion of the second cropped image on a second portion of the second cropped image to form an augmented second cropped image, the first portion different than the second portion; and
      training, by the data processing hardware, the machine learning model with the first cropped image and the augmented second cropped image.

2. The method of claim 1, wherein the duplicated first portion of the second cropped image has a rectangular shape with a variable length and width.

3. The method of claim 1, wherein overlaying the duplicated first portion of the second cropped image on the second portion of the second cropped image comprises:
   selecting a random location of the second cropped image for the second portion of the second cropped image; and
   overlaying the duplicated first portion of the second cropped image at the selected random location.

4. The method of claim 1, wherein training the machine learning model with the first cropped image and the augmented second cropped image comprises:
   determining a first cross-entropy loss for the first cropped image;
   determining a second cross-entropy loss for the augmented second cropped image; and
   determining a total cross-entropy loss based on the first cross-entropy loss and the second cross-entropy loss.

5. The method of claim 4, wherein the total cross-entropy loss comprises a sum of the first cross-entropy loss and the second cross-entropy loss.

6. The method of claim 1, wherein each training sample is unlabeled.

7. The method of claim 1, wherein the machine learning model comprises a convolutional neural network.

8. The method of claim 1, wherein the machine learning model is configured to detect anomalous patterns in image data.

9. The method of claim 1, further comprising, prior to overlaying the duplicated first portion of the second cropped image on the second portion of the second cropped image, rotating, by the data processing hardware, the duplicated first portion of the second cropped image.

10. The method of claim 1, further comprising, prior to overlaying the duplicated first portion of the second cropped image on the second portion of the second cropped image, applying, by the data processing hardware, a color jitter to the duplicated first portion of the second cropped image.

11. A system comprising:
data processing hardware; and
memory hardware in communication with the data processing hardware, the memory hardware storing instructions that when executed on the data processing hardware cause the data processing hardware to perform operations comprising:
obtaining a set of training samples; and
during each of one or more training iterations, for each training sample in the set of training samples:
cropping the training sample to generate a first cropped image;
cropping the training sample to generate a second cropped image that is different than the first cropped image;
duplicating a first portion of the second cropped image;
overlaying the duplicated first portion of the second cropped image on a second portion of the second cropped image to form an augmented second cropped image, the first portion different than the second portion; and
training a machine learning model with the first cropped image and the augmented second cropped image.

12. The system of claim 11, wherein the duplicated first portion of the second cropped image has a rectangular shape with a variable length and width.

13. The system of claim 11, wherein overlaying the duplicated first portion of the second cropped image on the second portion of the second cropped image comprises:
selecting a random location of the second cropped image for the second portion of the second cropped image; and
overlaying the duplicated first portion of the second cropped image at the selected random location.

14. The system of claim 11, wherein training the machine learning model with the first cropped image and the augmented second cropped image comprises:
determining a first cross-entropy loss for the first cropped image;
determining a second cross-entropy loss for the augmented second cropped image; and
determining a total cross-entropy loss based on the first cross-entropy loss and the second cross-entropy loss.

15. The system of claim 14, wherein the total cross-entropy loss comprises a sum of the first cross-entropy loss and the second cross-entropy loss.

16. The system of claim 11, wherein each training sample is unlabeled.

17. The system of claim 11, wherein the machine learning model comprises a convolutional neural network.

18. The system of claim 11, wherein the machine learning model is configured to detect anomalous patterns in image data.

19. The system of claim 11, wherein the operations further comprise, prior to overlaying the duplicated first portion of the second cropped image on the second portion of the second cropped image, rotating the duplicated first portion of the second cropped image.

20. The system of claim 11, wherein the operations further comprise, prior to overlaying the duplicated first portion of the second cropped image on the second portion of the second cropped image, applying a color jitter to the duplicated first portion of the second cropped image.

* * * * *